United States Patent [19]

Nishiwaki

[11] Patent Number: 4,491,197
[45] Date of Patent: Jan. 1, 1985

[54] SPEED CONTROL APPARATUS FOR A.C. ELEVATOR CAR DRIVE MOTOR

[75] Inventor: Muneo Nishiwaki, Inazawa, Japan

[73] Assignee: Mitsubishi Denki Kabushiki Kaisha, Tokyo, Japan

[21] Appl. No.: 476,941

[22] Filed: Mar. 18, 1983

[30] Foreign Application Priority Data

Mar. 29, 1982 [JP] Japan .................... 57-50518

[51] Int. Cl.³ ............................. B66B 1/32
[52] U.S. Cl. ...................... 187/29 R; 318/258; 318/741; 318/759; 318/760; 318/761; 318/762
[58] Field of Search ............... 187/29; 318/759, 760, 318/761, 762, 344, 345 C, 345 CB, 345 B, 345 D, 345 F, 345 G, 345 H, 768, 779, 772, 257, 269, 258, 741

[56] References Cited

U.S. PATENT DOCUMENTS

| | | | |
|---|---|---|---|
| 3,798,519 | 3/1974 | Habisohn | 187/29 X |
| 4,042,069 | 8/1977 | Ohira et al. | 187/29 R |
| 4,078,189 | 3/1978 | Nash et al. | 318/740 |
| 4,078,191 | 3/1978 | Morters et al. | 318/741 X |
| 4,093,898 | 6/1978 | Morters et al. | 318/740 |
| 4,100,469 | 7/1978 | Nelson et al. | 318/779 X |
| 4,122,919 | 10/1978 | Anzai | 187/29 R |
| 4,176,306 | 11/1979 | Asano et al. | 318/772 |
| 4,213,517 | 7/1980 | Ando | 187/29 R |
| 4,307,793 | 12/1981 | Caputo | 187/29 R |
| 4,319,665 | 3/1982 | Komuro et al. | 187/29 R |

FOREIGN PATENT DOCUMENTS

| | | | |
|---|---|---|---|
| 145248 | 12/1978 | Japan | 187/29 M |
| 235149 | 5/1969 | U.S.S.R. | 318/741 |

*Primary Examiner*—J. V. Truhe
*Assistant Examiner*—Paul Shik Luen IP
*Attorney, Agent, or Firm*—Sughrue, Mion, Zinn, Macpeak and Seas

[57] ABSTRACT

An SCR bridge of an elevator speed control apparatus is connected between an induction motor 5 and two (R, S) of the three-phase power supply terminals. Two diagonally opposite legs of the bridge comprise single SCR's 25, 26, and the other two legs each comprise a pair of parallel, reverse polarity SCR's 21, 22; 23, 24. The third power supply terminal is connected directly to the motor through a single switch contact 8. By appropriately controlling the switch contact and the SCR α s in accordance with the difference between the actual and commanded elevator speeds, the bridge can be configured to implement three phase running during acceleration and constant speed modes, single phase running during a transitional slow down mode, and D.C. braking during a deceleration mode.

6 Claims, 11 Drawing Figures

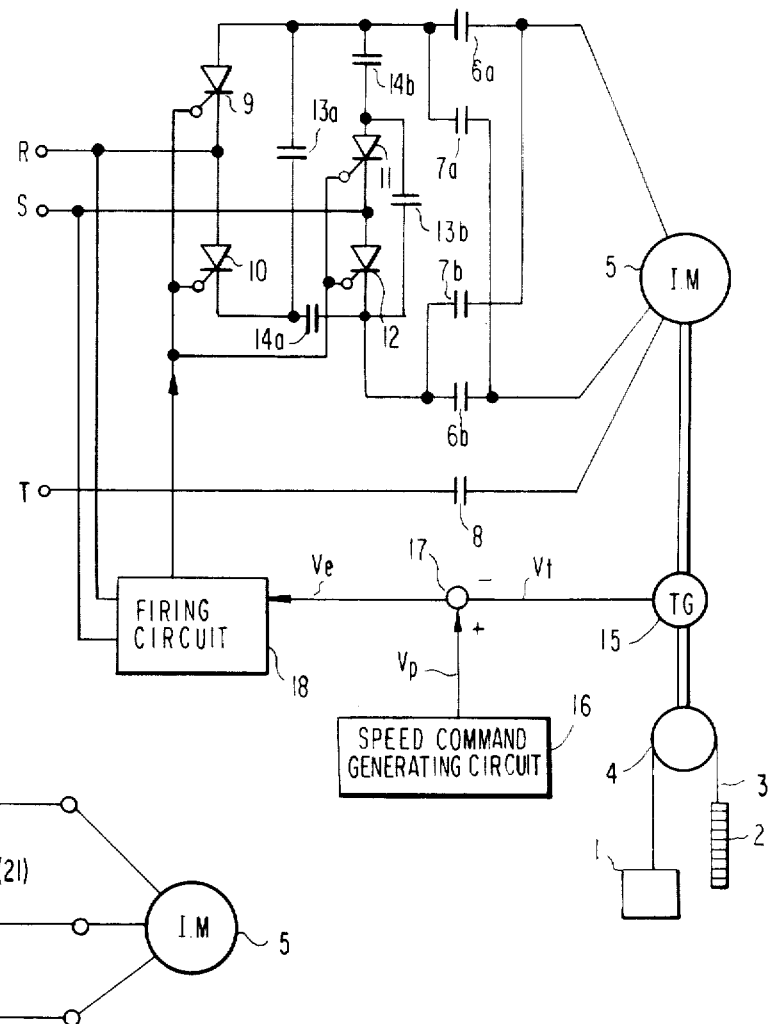
FIG. 1
PRIOR ART
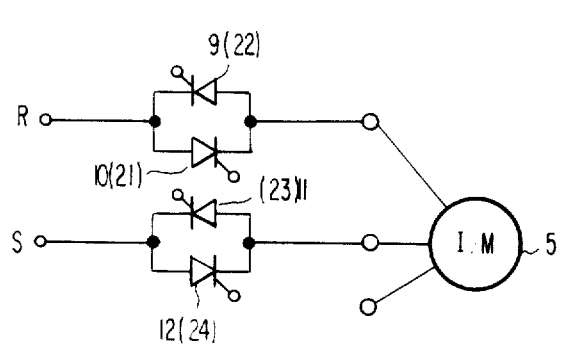
FIG. 2
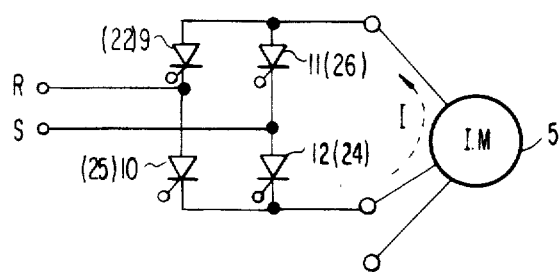

SPEED CONTROL APPARATUS FOR A.C. ELEVATOR CAR DRIVE MOTOR

BACKGROUND OF THE INVENTION

This invention relates in general to a speed control apparatus for an alternating current motor driving an elevator car, and more particularly to such a three phase induction motor which is operated in three phase running, single phase running, and direct current braking modes.

A speed control apparatus for an induction motor operated in the three modes described above is disclosed in laid open Japanese patent application publication number JP No. 49-39,722, wherein one phase of the motor is controlled by means of two thyristors and two diodes in an acceleration mode, and direct current braking is performed by means of contacts changing over the circuitry in a decelerating mode. A similar apparatus is also disclosed in U.S. Pat. No. 4,083,431.

Japanese laid open utility model application publication number JP No. 52-169,262 discloses an arrangement wherein two phases of the motor are controlled by four thyristors in an acceleration mode, and direct current braking is again performed by means of contacts changing over the circuitry.

By way of a more specific example, a conventional speed control apparatus of the general type mentioned above is shown in FIGS. 1 to 3, wherein an elevator car 1 is connected to a counterweight 2 by a cable 3 wound around a sheave 4 driven by a three phase induction motor 5. The three motor phases are connected to terminals R, S and T of a three phase alternating current electric power source.

Contacts 6a, 6b of an electromagnetic switch or relay (not shown) which close when the car goes up and contacts 7a, 7b of a similar switch (not shown) which close when the car goes down are respectively inserted in the R and S phases of the motor. An electromagnetic switch contact 8 which closes when the car starts and opens when the car reaches a retarding command point as will be described later is connected to the T phase of the motor.

A thyristor or SCR 9 is connected in series between the R phase terminal and contact 6a, and ditto for a thyristor or SCR 10 between the R phase terminal and contact 6b, a thyristor or SCR 11 between the S phase terminal and contact 6a, and a thyristor or SCR 12 between the S phase terminal and contact 6b. Contacts 13a, 13b of an electromagnetic switch (not shown) which are closed when the car starts and opened after it reaches the retarding command point are respectively connected both across a series circuit comprising thyristors 9, 10 and across a series circuit comprising thyristors 11, 12. Contacts 14a, 14b of a braking switch (not shown) which are opened when the car starts and closed after it reaches the retarding command point are respectively inserted both between the thyristors 10, 12 and between the thyristors 9, 11.

A pilot or tachometer generator 15 which generates an actual motor speed signal Vt is directly connected to the motor 5. The output of this generator is fed to an adder 17 together with a speed command signal Vp from a generating circuit 16. The adder 17 generates a speed deviation or difference signal Ve which is fed to a firing circuit 18, which in turn generates firing signals for the thyristors 9-12.

In operation, assume that the car is going up under a heavy load. This condition corresponds to FIG. 3(a), which shows the states of contacts 8, 13a, 13b, 14a and 14b, and the running pattern. When a start signal is given and the contacts 7a, 7b are open, the contacts 6a, 6b, 8, 13a and 13b are closed while the contacts 14a, 14b are opened. This connects the thyristors 9, 10 in a parallel, reverse polarity circuit in the R phase as shown in FIG. 2(a), and similarly the thyristors 11, 12 in the S phase.

The speed command circuit 16 generates an accelerating command signal whose magnitude increases as a function of time while the car is accelerated, a constant speed command signal while the car runs at a constant speed, and a decelerating command signal whose magnitude decreases as a function of the position of the car while it decelerates, as shown in FIG. 3(a).

The firing circuit 18 generates firing signals for the thyristors to implement their phase control corresponding to the speed deviation signal Ve.

Thus, the motor 5 is controlled by way of a primary voltage controlling method and its torque is adjusted over a range from zero torque to full three phase torque.

When the car reaches the decelerating command point A in FIG. 3(a), contact 8 is opened which disconnects the T phase terminal of the power source so that only single phase power is supplied to the motor as shown in FIG. 2(b). This single phase running mode is transitionally employed because changing from a three phase mode directly to an open phase or D.C. braking mode would cause a rapid torque decrease and result in passenger discomfort.

The single phase running reduces the speed of the car, and when the actual speed signal $V_{t1}$ exceeds the speed command signal Vp, the polarity of the deviation signal Ve changes. This in turn causes the contacts 13a, 13b to open and the contact 14a, 14b to close, whereby the thyristors form a single phase full-wave rectifier as shown in FIG. 2(c). This supplies a direct current I to the motor 5, which effects D.C. braking.

The conditions when the car is going up under a light load are shown in FIG. 3(b). In this case the car starts up with the three phase circuit shown in FIG. 2(a). Before it reaches the retarding command point A in FIG. 3(b), however, the actual speed signal $V_{t2}$ exceeds the speed command signal Vp. Consequently, when the car reaches point A the contacts 8, 13a and 13b are opened, and the contacts 14a and 14b are closed. The operation of the motor is thus shifted directly from a three phase to a D.C. braking mode.

When the car is going down, the light passenger load condition corresponds to FIG. 3(a) and the heavy passenger load condition corresponds to FIG. 3(b).

In the apparatus shown in FIG. 1, the thyristors 9-12 functioning as the control elements for power running and for torque retardation are selectively switched by the contacts 13a, 13b and 14a, 14b. These electromagnetic contacts are not closed simultaneously, however, and thus there is some time delay in shifting the operation of the motor 5 from the A.C. running mode to the D.C. braking mode. This results in the torque generated in the motor being discontinuous or interrupted, which has undesirable effects on the control system. Such switching also accelerates the erosion or consumption of the contacts by reason of their repeated opening and closing, which requires considerable and costly maintenance work. Finally, such mechanical switch contacts are disruptively noisy during operation.

SUMMARY OF THE INVENTION

An object of this invention is to provide an elevator speed control apparatus which avoids the above-mentioned defects in the prior art. This object is achieved by removing or eliminating the contacts 13a, 13b, 14a and 14b connected across and between the thyristor or SCR pairs, and replacing them with two additional SCR's individually connected in a parallel, reverse polarity manner across two of the original "bridge" SCR's. By appropriately controlling the switching or conductive states of the various SCR's, circuit configurations corresponding to three phase running, single phase running and direct current braking can easily be realized, without the attendant disadvantages of the prior art mechanical contacts.

BRIEF DESCRIPTION OF THE DRAWINGS

FIG. 1 is a simplified schematic diagram showing a prior art elevator speed control apparatus, FIGS. 2(a), 2(b) and 2(c) are equivalent control circuits, after switching, corresponding to three phase running, single phase running, and direct current braking, respectively.

DETAILED DESCRIPTION OF THE PREFERRED EMBODIMENT

Figure 3A:
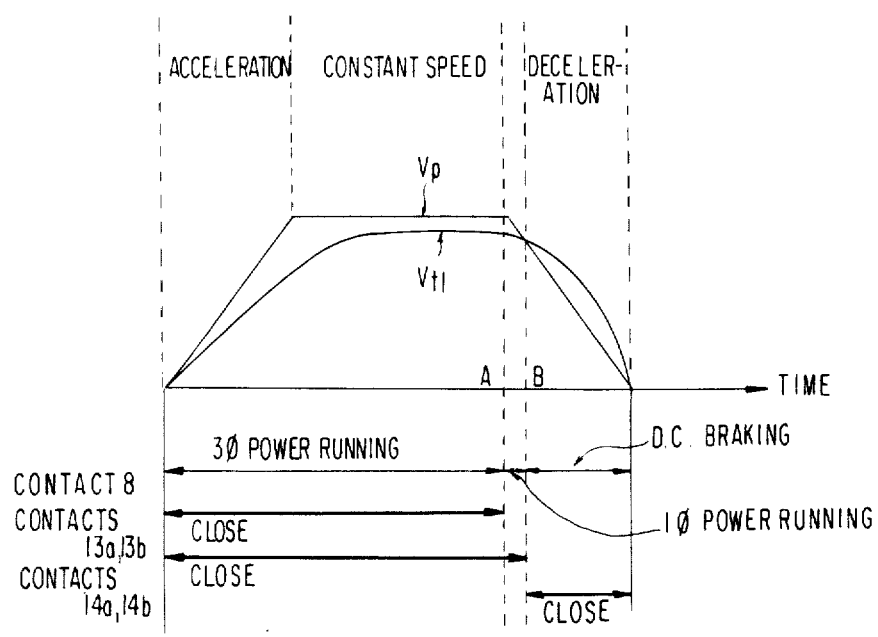
FIGS. 3(a) and 3(b) illustrate the operating and switching conditions of the apparatus shown in FIG. 1 corresponding to going up under a heavy load and under a light load, respectively.
Figure 3B:
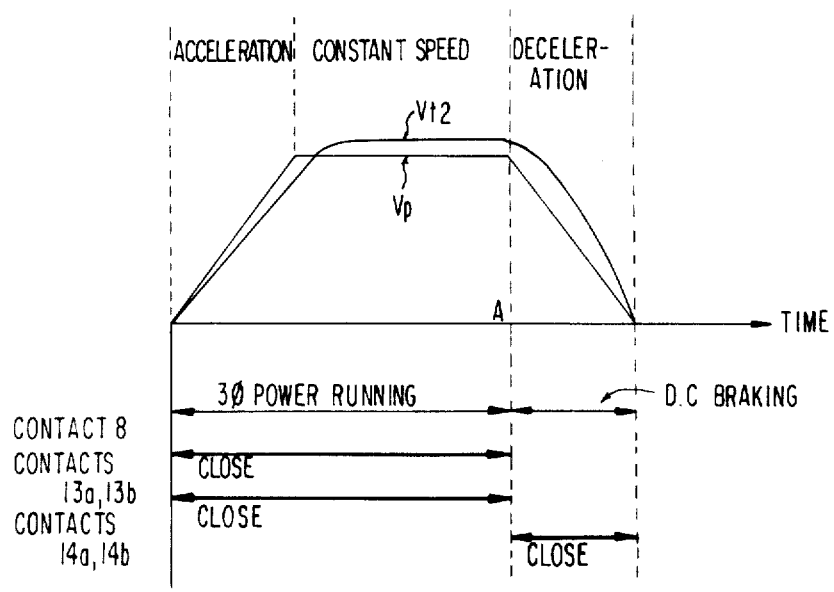
Figure 4:
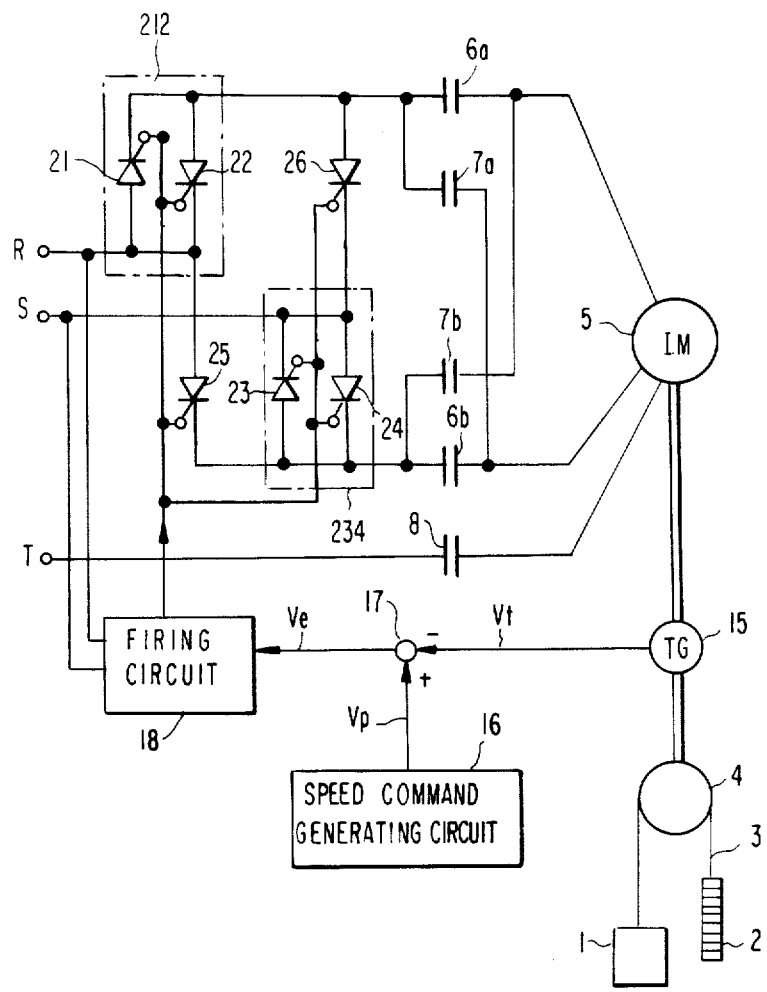
FIG. 4 is a simplified schematic diagram showing an embodiment of this invention.

In FIG. 4 a first bidirectional semiconductor switching circuit 212 is inserted between the R phase terminal and contact 6a, and comprises two thyristors or SCR's 21, 22 connected in a parallel, reverse polarity manner. In a similar manner, a second semiconductor switching circuit 234 is inserted between the S phase terminal and contact 6b, comprising two thyristors or SCR's 23, 24.

A third semiconductor switch, SCR 25, has its anode connected to the R phase terminal and its cathode connected to the motor side of the switching circuit 234, and similarly a fourth semiconductor switch, SCR 26, has its anode connected to the motor side of the switching circuit 212 and its cathode connected to the S phase teminal.

Thus, and as is clear from FIG. 4, the prior art mechanical contacts 13a, 13b, 14a and 14b of FIG. 1 have been eliminated and, in effect, replaced by two additional SCR's 21, 23 connected in reverse polarity across SCR's 22, 24, respectively. The other reference numerals in FIG. 4 correspond to those in FIG. 1.

Figure 5:
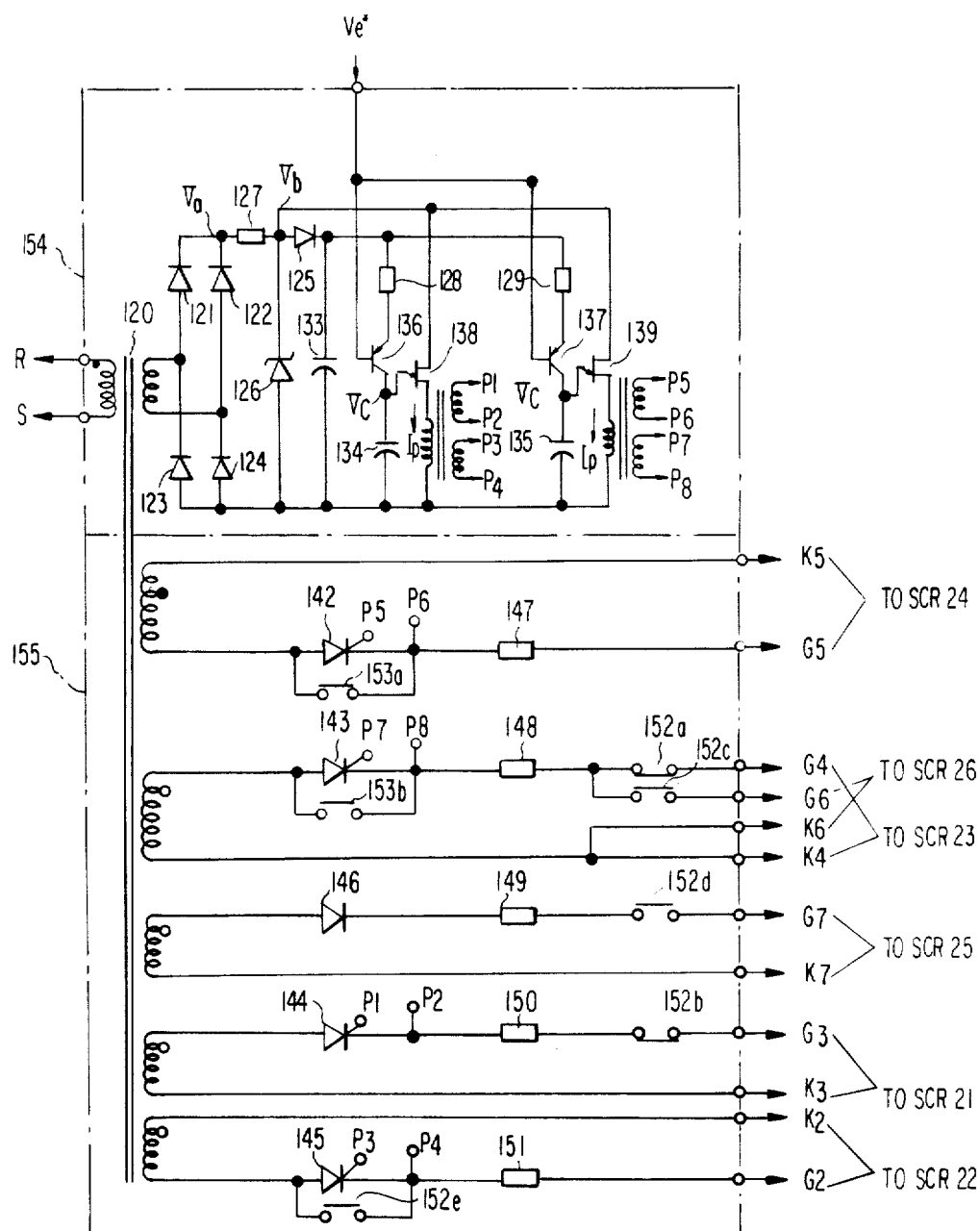
FIG. 5 is a circuit diagram showing a main portion of the firing circuit of FIG. 4.

A main portion of the circuit structure of the firing circuit 18 in FIG. 4 is shown in FIG. 5, and includes a pulse generating circuit 154 and a firing signal generating circuit 155. A single phase transformer 120 whose primary winding is connected to the R and S phases serves as a power supply. A diode bridge rectifier 121-124 is connected to the secondary of the transformer, and a resistor 127, a diode 125, a Zener diode 126 and a smoothing capacitor 133 are connected in the output of the rectifier.

A signal Ve* corresponding to the magnitude of the deviation signal Ve is supplied to the base of a transistor 136, having an emitter resistor 128 and a collector charging capacitor 134. A similar, parallel circuit is provided by a transistor 137, an emitter resistor 129, and a collector charging capacitor 135.

Unijunction transistors 138, 139 are coupled to the outputs of transistors 136, 137, respectively, and drive pulse transformers 140, 141. Symbols $P_1$-$P_8$ designate the secondary winding outputs of the transformers, which are supplied to the correspondingly designated terminals in the firing signal generator 155.

Reference numerals 142-145 designate thyristors and reference numeral 146 designates a diode. Current limiting resistors 147-151 are serially connected to the thyristors and diode. Normally closed contacts 152a, 152b of a relay (not shown) for D.C. braking, which is deenergized during A.C. power running, are serially connected to the thyristors 143, 144, and reference numerals 152c-152e designate normally open contacts of the relay.

Contacts 153a, 153b of a relay (not shown) which are closed a predetermined time after the motor 5 starts and opened before D.C. braking are connected in parallel across the thyristors 142, 143. Outputs G2, K2 through G7, K7 are connected to the corresponding terminals of SCR's 21-26 in FIG. 4.

In operation, when the car is to go up under heavy load, before startup contacts 6a, 6b and 8 are closed and the firing circuit 18 ignites the SCR's 21-24 to control their firing angles. SCR's 25 and 26 remain extinguished, whereby the three phase running circuit of FIG. 2(a) is formed. When the car reaches the decelerating command point A in FIG. 6 contact 8 opens to form the circuit of FIG. 2(b) for single phase running.

Figure 6:
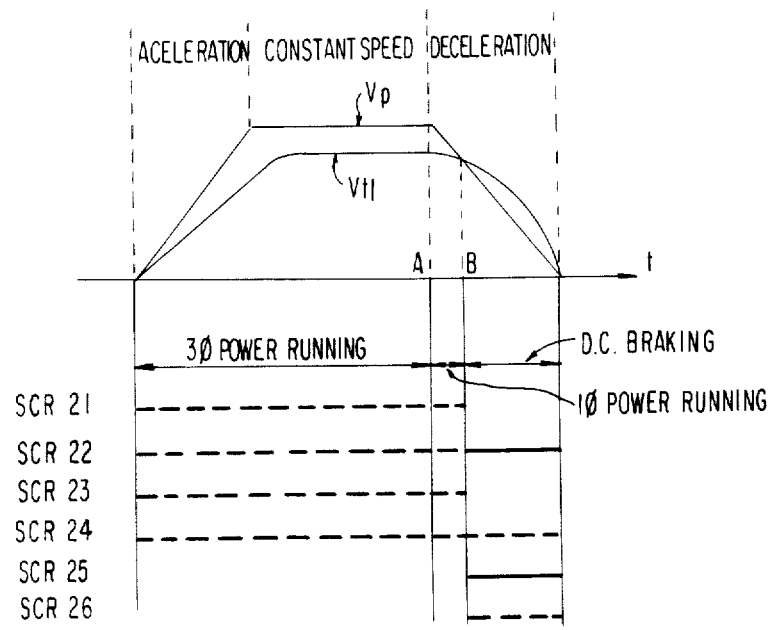
FIG. 6 illustrates the operating and switching conditions of the circuit shown in FIG. 4.

When the polarity of the deviation signal Ve changes at point or time B in FIG. 6, the firing circuit extinguishes SCR's 21, 23 and ignites SCR's 25, 26 to form the D.C. braking circuit of FIG. 2(c). In this mode SCR's 22 and 25 are held conductive during the full half cycles of the R and S phases to provide a continuous path for the flywheel current flowing through the motor 5.

Concerning the operation of the firing circuit 18, the rectified transformer secondary voltage Va is clamped by the Zener diode 126 to a D.C. voltage level Vb which is smoothed by the capacitor 133. The transistors 136, 137 are controlled by the signal Ve*, and as this is proportional to the deviation signal Ve, the charging current to the capacitors 134, 135 is controlled by the deviation signal. The charge voltages Vc on the capacitors are applied to the bases of the unijunction transistors 138, 139, and when these voltages Vc exceed a predetermined value the transistors discharge the capacitors through the primary windings of the transformers 140, 141 (current Ip). This current induces pulse voltages at the secondary terminals P1~P8, which fires the associated SCR's 142~145.

Figure 7:
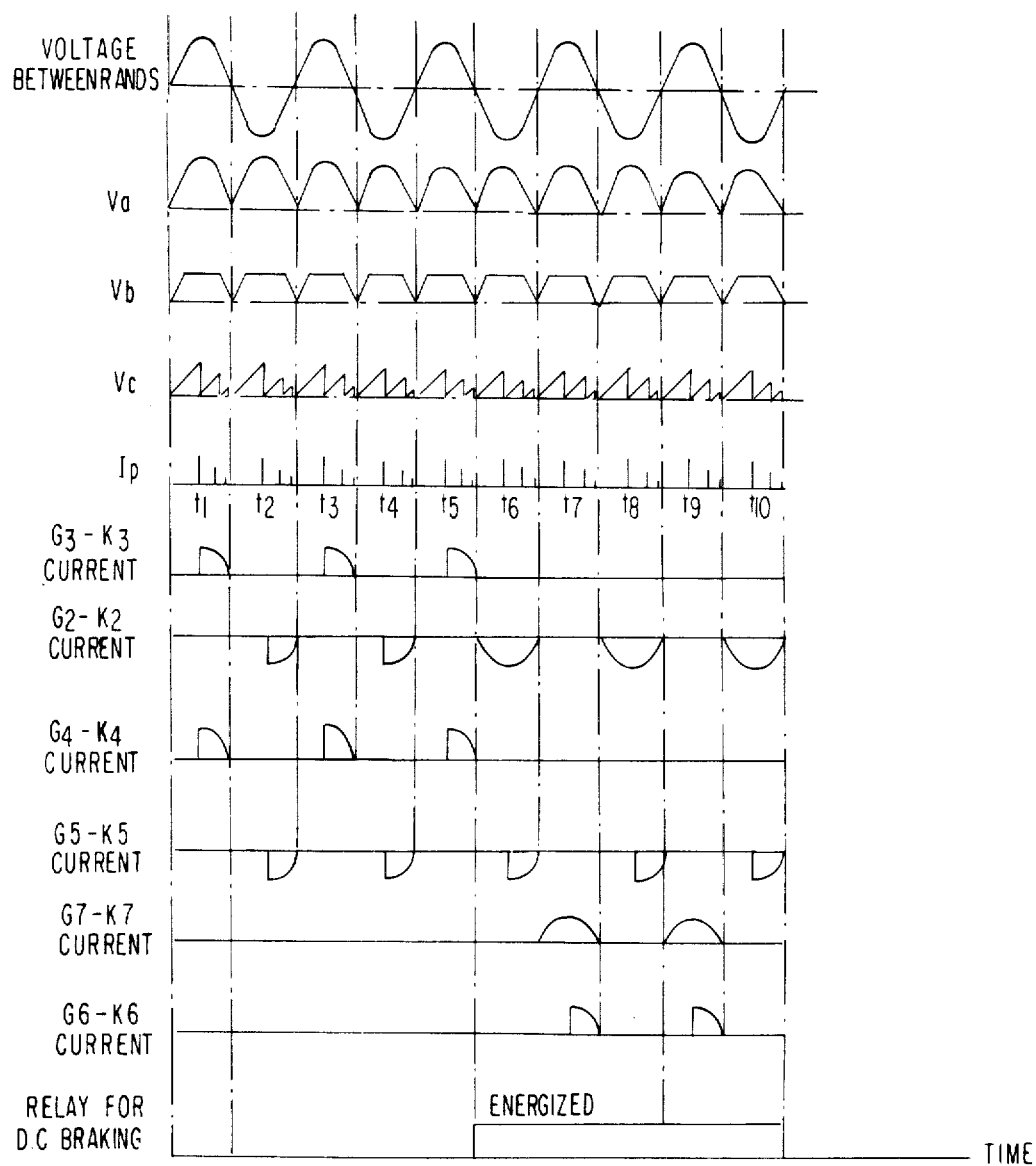
FIG. 7 shows simplified waveforms at various points in FIG. 5.

Consequently, and as shown in FIG. 7, outputs G2-K2~G5-K5 are produced which control the firing angles of SCR's 21~24 to increase the voltage applied to the motor 5 and accelerate the car.

After a predetermined time the relay contacts 153a, 153b close, whereby the full voltage cycle between the R and S phases of the power source is applied to SCR's 23, 24.

When D.C. braking is performed the contacts 153a, 153b and 152a, 152b open and the contacts 152c~152e close, which produces outputs G2-K2, G5-K5, G6-K6 and G7-K7 as shown on the right side of FIG. 7. SCR's 22 and 25 are thus held conductive during the entire half cycle periods, and only the firing angles of SCR's 24 and 26 are controlled.

In FIG. 7 the timing points $t_1 \sim t_{10}$ when the largest current Ip flows through the secondary windings of the transformers 139, 140 are simplistically shown as being the same, although in actual use these points are shifted according to the value of Ve*.

Figure 8:
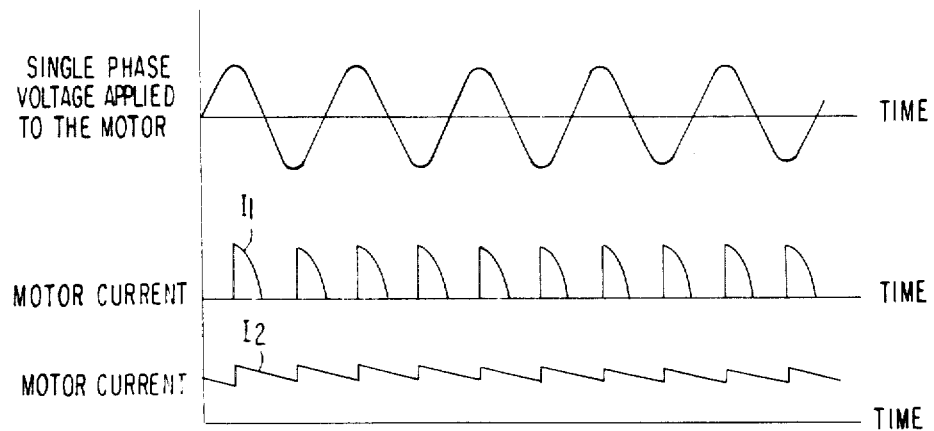
FIG. 8 shows motor current waveforms in the direct current braking mode.

When the car is going up under a light load, single phase running is not performed and the motor is shifted directly from three phase running to D.C. braking. Namely, at point B in FIG. 6 SCR's 21 and 23 are cut off, SCR's 22 and 25 are held conductive during full half cycles, and SCR's 24 and 26 are intermittently gated on. Since SCR's 22 and 25 are held conductive during D.C. braking to provide a continuous flow path for the flywheel current, the motor current is less rippled and smooth as shown in FIG. 8, where the intermittent current $I_1$ corresponds to the motor current during firing angle control, and the continuous current $I_2$ corresponds to that during D.C. braking. Consequently, motor torque ripples are minimized and the noise produced by the motor is greatly reduced.

The contacts 6a, 6b, 7a and 7b are disposed between the switching circuits 212, 234 and the motor instead of between the power source and the switching circuits to provide a constant rather than an intermittent power supply to the latter. This avoids any transient phenomena due to the operation of the contacts, which could adversely affect the firing angle control of the SCR's.

Semiconductor switches such as transistors, thyristors, etc. may be substituted for the contacts 6a, 6b, 7a, 7b and 8, and transistors may be substituted for the SCR's 21~26 when the power loss in the drive circuit for such transistors is sufficiently low.

What is claimed is:

1. An apparatus for controlling the speed of an elevator driven by an alternating current motor, comprising:
   (a) first switching means (6a, 6b, 7a, 7b) for changing the direction of rotation of a three phase induction motor (5) driving an elevator car (1), said switching means being connected between first and second phases of said motor and an electrical power source,
   (b) second switching means (8) connected between a third phase of said motor and said power source, and adapted to be closed during acceleration and constant speed running of said motor and opened during the deceleration thereof,
   (c) a first bidirectionally conductible semiconductor switching circuit (212) connected between said first phase of said motor and said power source, and having a control input terminal,
   (d) a second bidirectionally conductible semiconductor switching circuit (234) connected between said second phase of said motor and said power source, and having a control input terminal,
   (e) a third unidirectionally conductible semiconductor switching circuit (25) having an anode electrode connected to a power source side of said first switching circuit, a cathode electrode connected to a motor side of said second switching circuit, and a control electrode,
   (f) a fourth unidirectionally conductible semiconductor switching circuit (26) having a cathode electrode connected to a power source side of said second switching circuit, an anode electrode connected to a motor side of said first switching circuit, and a control electrode,
   (g) a speed command generating circuit (16) for generating a speed reference signal for said motor, and
   (h) a firing circuit (18) for generating firing control signals for said first, second, third and fourth switching circuits in response to said speed reference signal and a detected speed signal of said motor such that when said car is in a running mode said second switching means is closed, said first and second switching circuits are bidirectionally conductive, and said third and fourth switching circuits are non-conductive to thereby supply three phase alternating current to said motor, when said car is in a deceleration mode wherein the speed of said car is lower than a speed corresponding to said speed reference signal said second switching means is opened, said first and second switching circuits are bidirectionally conductive, and said third and fourth switching circuits are non-conductive to thereby supply single phase alternating current to said motor, and when said car is in a braking mode said second switching means is opened, said first and second switching circuits are unidirectionally conductive and said third and fourth switching circuits are conductive to supply direct current to said motor.

2. An apparatus according to claim 1, wherein said first and third switching circuits are rendered conductive during full half cycles of said power source when said car is in a braking mode.

3. An apparatus according to claim 2, wherein said first switching means is connected between said motor and the motor sides of said first and second switching circuits.

4. An apparatus according to claim 2, wherein said first and second switching circuits each comprise two thyristors connected in a parallel, reverse polarity manner.

5. An apparatus according to claim 3, wherein power supply inputs of said firing circuit are connected to the first and second phases of said power source.

6. An apparatus according to claim 4, wherein said third and fourth switching circuits each comprise a thyristor.

* * * * *